United States Patent
Ling (10) Patent No.: US 10,310,194 B2
(45) Date of Patent: Jun. 4, 2019

(54) POSITIONING MOLD OF OPTICAL FIBER CONNECTOR

(71) Applicant: Kow-Je Ling, Taipei (TW)

(72) Inventor: Kow-Je Ling, Taipei (TW)

( * ) Notice: Subject to any disclaimer, the term of this patent is extended or adjusted under 35 U.S.C. 154(b) by 17 days.

(21) Appl. No.: 15/788,834

(22) Filed: Oct. 20, 2017

(65) Prior Publication Data

US 2018/0120521 A1 May 3, 2018

(30) Foreign Application Priority Data

Oct. 27, 2016 (TW) .............................. 105134802 A (51) Int. Cl.
*G02B 6/38* (2006.01)

(52) U.S. Cl.
CPC ......... *G02B 6/3887* (2013.01); *G02B 6/3865* (2013.01); *G02B 6/3885* (2013.01)

(58) Field of Classification Search
CPC .. G02B 6/3644; G02B 6/3672; G02B 6/3696; G02B 6/3887

USPC .......... 385/52, 53, 59, 75–83, 120, 134–139
See application file for complete search history.

(56) References Cited

U.S. PATENT DOCUMENTS 6,264,375 B1 * 7/2001 Ohtsuka ............... G02B 6/3865
264/1.25
2017/0100865 A1 * 4/2017 Goodwin .......... B29C 45/14065

* cited by examiner

*Primary Examiner* — Michael P Mooney
(74) *Attorney, Agent, or Firm* — Bacon & Thomas, PLLC (57) ABSTRACT

A positioning mold of optical fiber connector includes a lower mold board and a thin board. The lower mold board includes two positioning pins and at least one through aperture. The thin board is arranged above the lower mold board, and is provided with two first through holes and with at least one optical fiber positioning aperture. The two first through holes correspond to two positioning pins, and the at least one optical fiber positioning aperture to the at least one through aperture. Given such structure, even if optical fiber lines fracture inside of the optical fiber positioning apertures during the work of positioning, the fractured optical fiber lines can be taken out and replaced easily, so as to improve the productivity in manufacturing optical fiber connectors.

12 Claims, 10 Drawing Sheets

POSITIONING MOLD OF OPTICAL FIBER CONNECTOR

CROSS REFERENCE TO RELATED APPLICATION

This application claims the benefits of the Taiwan Patent Application Serial Number 105134802, filed on Oct. 27, 2016, the subject matter of which is incorporated herein by reference.

BACKGROUND OF THE INVENTION

1. Field of the Invention

The present invention relates to a positioning mold of optical fiber connector, and more particularly, to a positioning mold of optical fiber connector in use of thin boards to position optical fiber lines.

2. Description of Related Art

As the era is progressing, Internet technology has been developed and changed day after day. Various kinds of information transmitted and received through Internet have become an important source of intelligence. In particular, the Internet, with merits of its real-time characteristic, turns out to be one of the indispensable media for interpersonal relations and communication between politicians or between businesses.

Following a rapid growth of the amount of information, optical fiber cables have developed and played a role in connecting Internet facilities which serve as a medium of transmission. Along with popularization of Internet, optical fiber cables have been employed through official services or huge organizations such as enterprises for business purposes, and down to personal usage.

No matter whether optical fiber cables are used by enterprises or personal, optical fiber connectors are essential to bond the optical fiber cables with relevant hardware facilities. In manufacturing the optical fiber connectors, optical fiber lines, during positioning thereof, may fracture easily and that the remains are left in optical fiber positioning apertures, resulting in a lower yield rate and productivity for the production of optical fiber connectors.

Figure 1:
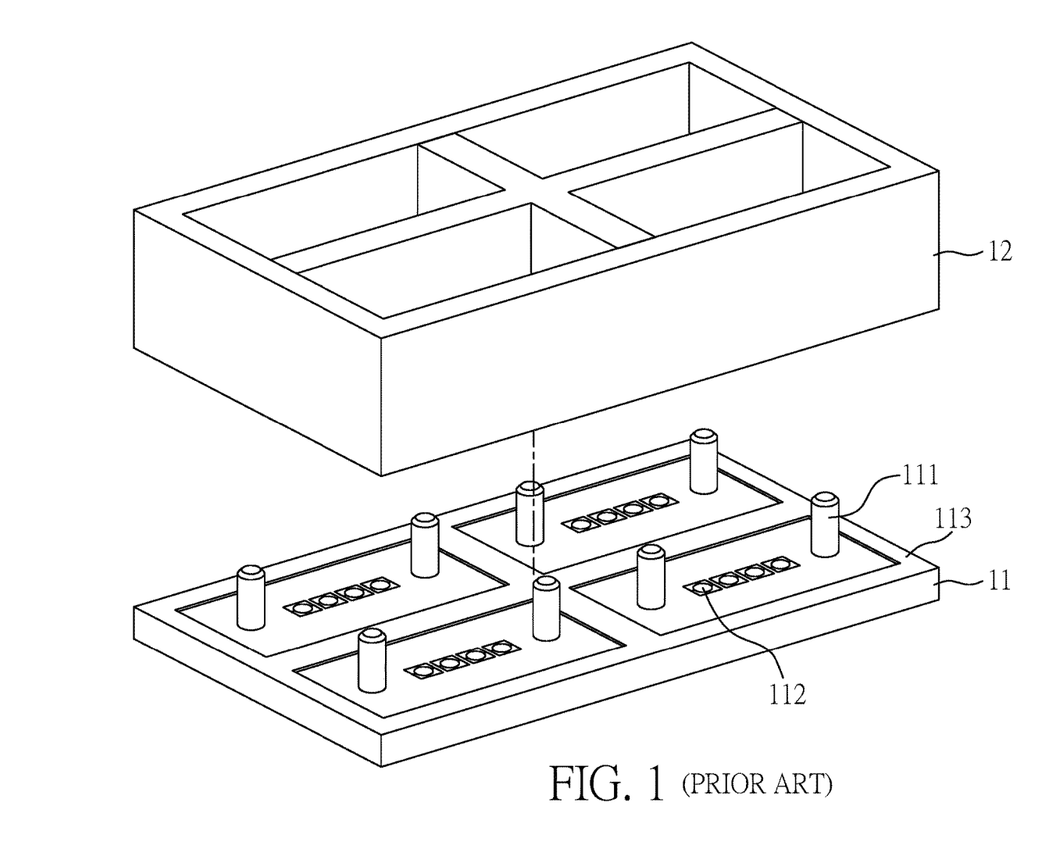
FIG. 1 is a schematic view illustrating a conventional positioning mold of optical fiber connector.
Figure 2:
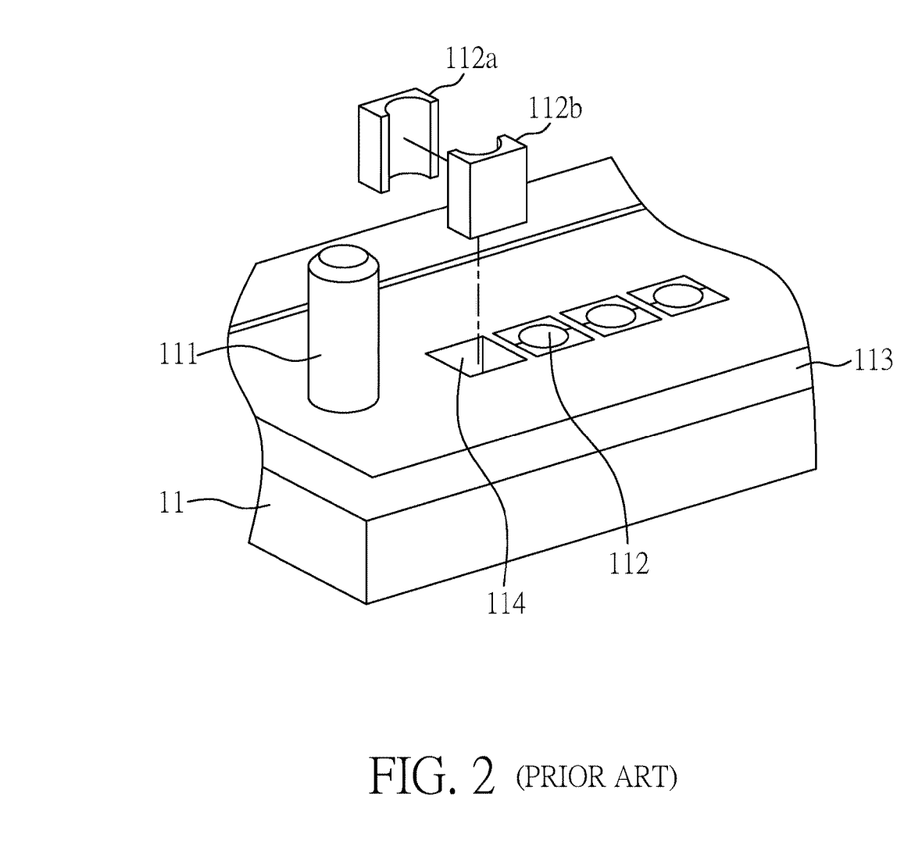
FIG. 2 is a schematic exploded view illustrating optical fiber positioning apertures of the conventional positioning mold of optical fiber connector.

In Taiwan Patent Application No. 104116613, filed by the same applicant, a positioning mold of optical fiber connector is employed. References are made to FIG. 1, a schematic view illustrating a conventional positioning mold of optical fiber connector; and FIG. 2, a schematic exploded view illustrating optical fiber positioning apertures of the conventional positioning mold of optical fiber connector. The conventional positioning mold of optical fiber connector comprises a lower mold board 11 and a mold wall 12. The lower mold board 11 includes eight positioning pins 111, sixteen apertures 112, and a protrusion 113. The lower mold board 11, in cooperation with the mold wall 12, can make four optical fiber connectors each time, where one optical fiber connector corresponds to two positioning pins 111, four apertures 112, and one protrusion 113. As shown in FIG. 2, optical fiber positioning blocks 112a, 112b and embedding holes 114 are processed by CNC (Computer Numerical Control) milling machines, then the optical fiber positioning blocks 112a, 112b are embedded into the embedding holes 114, thereafter wire electrical discharge machining (WEDM) is employed so as to form optical fiber positioning apertures 112.

However, when optical fiber lines are disposed into the optical fiber positioning apertures 112, the optical fiber lines fracture easily with leftover inside of the optical fiber positioning apertures 112. The fractured optical fiber lines cannot be taken out from the optical fiber positioning apertures 112 easily. Moreover, since the optical fiber positioning blocks 112a, 112b are embedded into the embedding holes 114, the optical fiber positioning blocks 112a, 112b can hardly be taken out for removing the fractured optical fiber lines.

Given the above, in use of thin boards, partitioned boards, and positioning pillars, with persistent research and experiments, a "Positioning Mold of Optical Fiber Connector" can be accomplished eventually, such that fractured optical fiber lines can be taken out easily and that productivity of optical fiber connectors can be improved.

SUMMARY OF THE INVENTION

To solve the problem given above, an object of the present invention is to provide a positioning mold of optical fiber connector so as to improve the productivity of optical fiber connectors.

To achieve the above-mentioned object, the positioning mold of optical fiber connector, in one of the aspects, comprises a lower mold board and a thin board. The lower mold board includes two positioning pins and at least one through aperture. The thin board is arranged above the lower mold board, and is provided with two first through holes and at least one optical fiber positioning aperture. The two first through holes correspond to two positioning pins, and the at least one optical fiber positioning aperture to the at least one through aperture. The thin board is fixedly engaged with the lower mold board so as to achieve the purpose of positioning optical fiber lines and of replacing thereof easily.

According to the present invention, the positioning mold of optical fiber connector may further comprise a plurality of fastening elements, and the lower mold board may further include a plurality of lower fastening apertures corresponding to the plurality of fastening elements. The thin board may further include a plurality of upper fastening apertures corresponding to the plurality of fastening elements. By the way of passing the plurality of fastening elements through the plurality of upper fastening apertures, respectively, and fastening the same into the plurality of lower fastening apertures, such that the thin board can be fixedly engaged with the lower mold board so as to anchor the thin board on the lower mold board firmly.

Further, according to the present invention, the lower mold board may further include a protrusion enclosing the thin board.

Still further, according to the present invention, the at least one optical fiber positioning aperture has a diameter smaller than the diameter of the at least one through aperture such that the optical fiber lines can be positioned smoothly.

According to the present invention, the thin board may be made of either one of plastic material, metallic material, and celluloid material, so that after formation of the optical fiber connectors, the work of demolding becomes easier.

Further, according to the present invention, the thin board may be formed by either one of laser cutting method, wet etching method, and dry etching method, such that the at least one optical fiber positioning aperture can obtain easily a normal diameter of 0.127 mm.

According to the present invention, the positioning mold of optical fiber connector, in another one of the aspects, comprises a bottom spacing board, a top spacing board at least one middle thin board, and a plurality of fastening elements. The bottom spacing board includes two positioning pins, at least one bottom board through aperture, and a plurality of first fastening hole. The top spacing board is arranged above the bottom spacing board, and includes two first through holes, at least one top board through aperture and a plurality of second fastening holes. The two first through holes correspond to the two positioning pins. The at least one middle thin board is arranged in between the bottom spacing board and the top spacing board, and includes two second through holes, at least one first optical fiber positioning aperture, and a plurality of third fastening holes. The two second through holes correspond to the two positioning pins, the at least one first optical fiber positioning aperture corresponds to the at least one top board through aperture and the at least one bottom board through aperture. The plurality of fastening elements correspond to the plurality of first fastening holes, the plurality of second fastening holes, and the plurality of third fastening holes, such that the bottom spacing board, the top spacing board, and the at least one middle thin board can be secured together.

Further, according to the present invention, the positioning mold of optical fiber connector may further comprise a plurality of positioning pillars. The bottom spacing board may further include a plurality of bottom board slots corresponding to the plurality of positioning pillars. The top spacing board may further include a plurality of top board slots corresponding to the plurality of positioning pillars. The at least one middle thin board may further include a plurality of first positioning apertures corresponding to the plurality of positioning pillars. As such, a mutual positioning purpose between the bottom spacing board, the top spacing board, and the at least one middle thin board can be enhanced.

According to the present invention, the positioning mold of optical fiber connector further comprises a top thin board arranged above the top spacing board. The top thin board includes two third through holes, at least one second optical fiber positioning aperture, and a plurality of fourth fastening holes. The two third through holes correspond to the two positioning pins, the at least one second optical fiber positioning hole to the at least one first optical fiber positioning aperture, and the plurality of fourth fastening holes to the plurality of fastening elements. The top thin board facilitates the performance of demolding.

Further, according to the present invention, the positioning mold of optical fiber connector further comprises at least one middle spacing board. The at least one middle spacing board includes two fourth through holes, at least one middle board through aperture, a plurality of fifth fastening holes, and a plurality of second positioning apertures. The two fourth through holes correspond to the two positioning pins, the at least one middle board through aperture to the at least one first optical fiber positioning aperture, the plurality of fifth fastening holes to the plurality of fastening elements, and the plurality of second positioning apertures to the plurality of positioning pillars. This will reinforce the strength of the positioning mold.

Still further, according to the present invention, the positioning mold of optical fiber connector further comprises a top protrusion arranged above the top spacing board and a bottom protrusion below the bottom spacing board. The top protrusion is provided with a plurality of sixth fastening holes corresponding to the plurality of fastening elements. The bottom protrusion is provided with a plurality of seventh fastening holes corresponding to the plurality of fastening elements. With the help of the structure of the top protrusion, the optical fiber connectors can be ground easily during a grinding work.

According to the present invention, the at least one first optical fiber positioning aperture and the at least one second optical fiber position aperture may, respectively, have a diameter smaller than that of the at least one top board through aperture, and smaller than that of the at least one bottom through aperture. As such, the optical fiber lines can be positioned smoothly.

Further, according to the present invention, both the at least one middle thin board and the top thin board are made of either one of plastic material, metallic material, and celluloid material, so that after formation of the optical fiber connectors, the work of demolding becomes easier.

Other objects, advantages, and novel features of the present invention will become more apparent from the following detailed descriptions when taken in conjunction with the accompanying drawings.

DETAILED DESCRIPTION OF THE PREFERRED EMBODIMENTS

Figure 3:
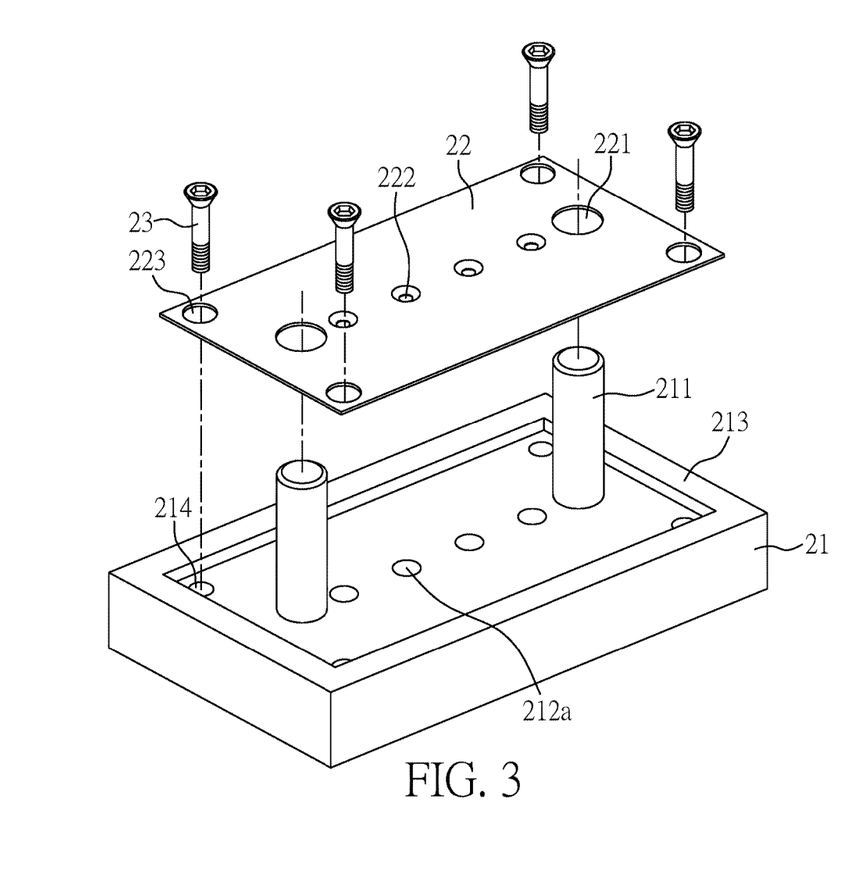
FIG. 3 is a schematic exploded view illustrating a positioning mold of optical fiber connector according to a first embodiment of the present invention.
Figure 4:
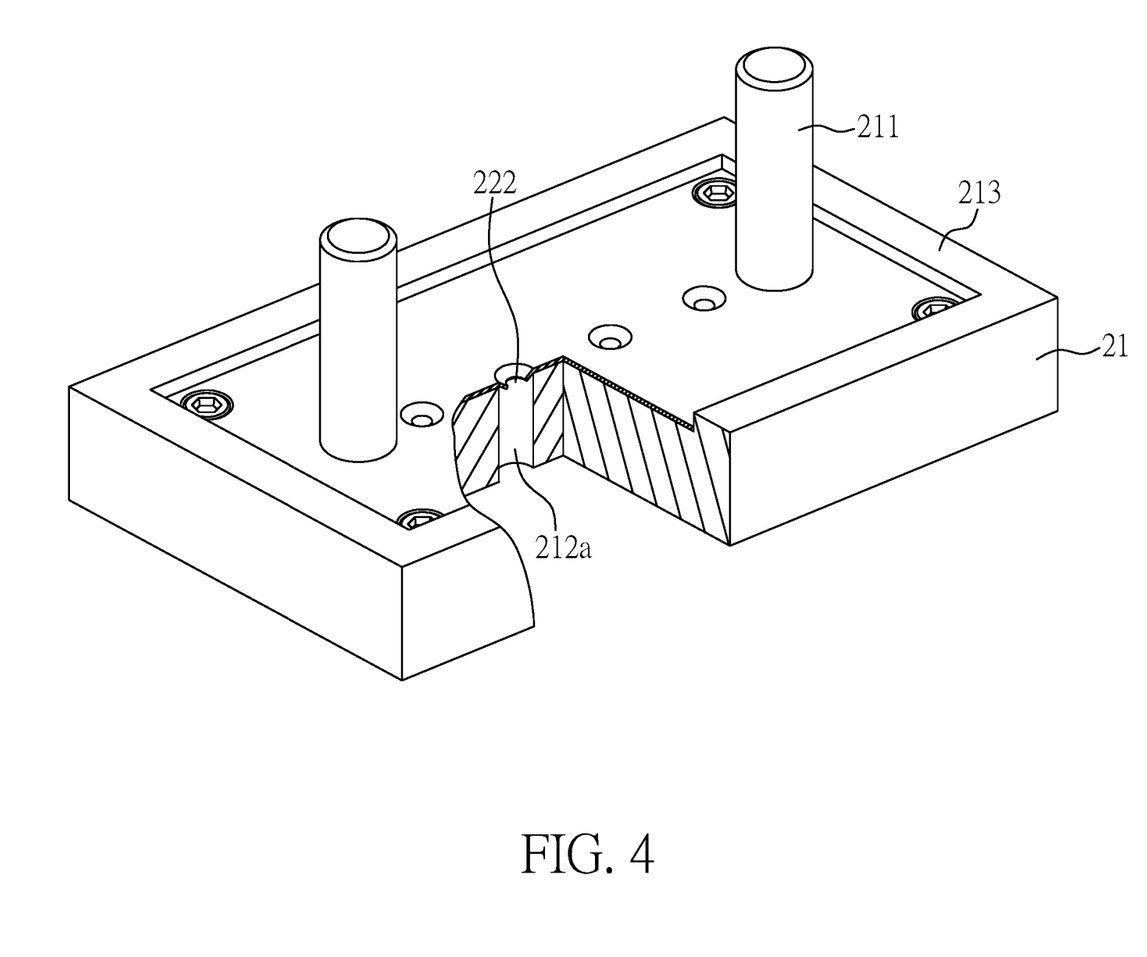
FIG. 4 is a partially cross-sectional view illustrating the positioning mold of optical fiber connector according to the first embodiment of the present invention.
Figure 5:
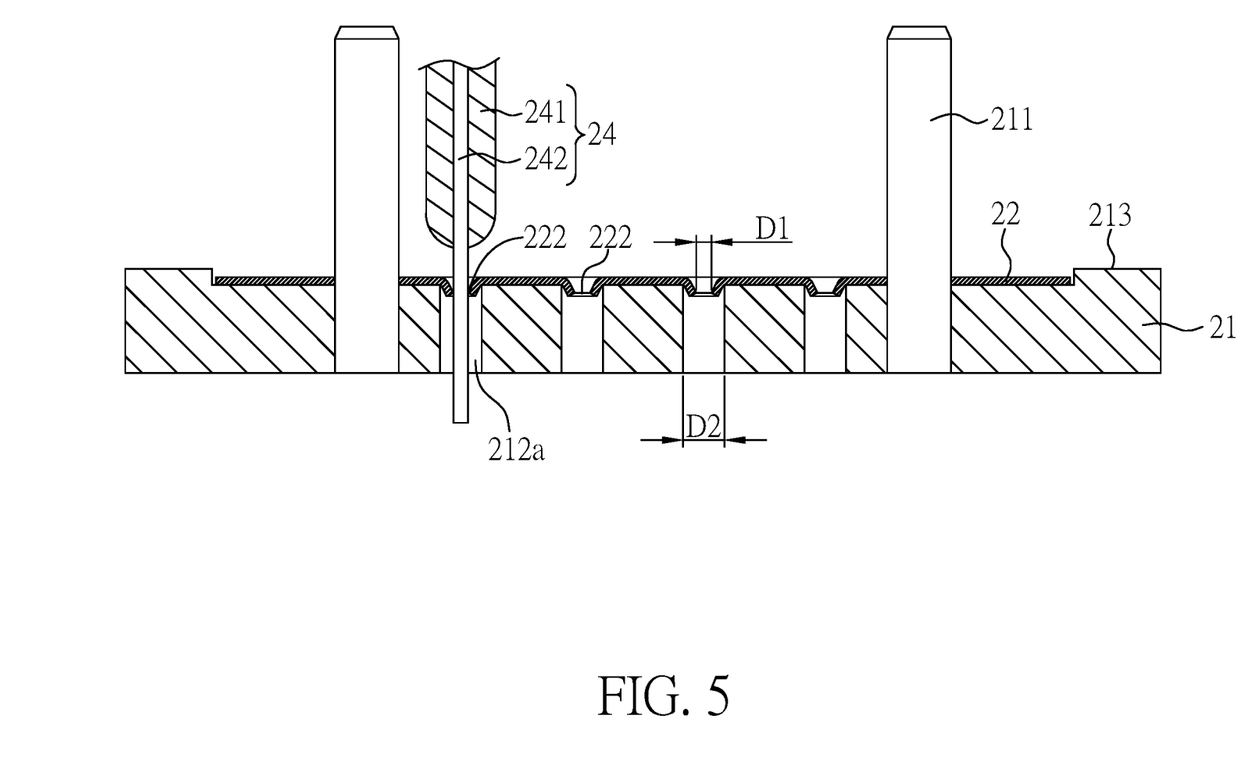
FIG. 5 is another cross-sectional view illustrating the positioning mold of optical fiber connector according to the first embodiment of the present invention.

References are made to FIG. 3, a schematic exploded view illustrating a positioning mold of optical fiber connector according to a first embodiment of the present invention; FIG. 4, a partially cross-sectional view illustrating the positioning mold of optical fiber connector; and FIG. 5 is another cross-sectional view illustrating the positioning mold of optical fiber connector. The positioning mold of optical fiber connector comprises a lower mold board 21, a thin board 22, and four fastening elements 23.

In the first embodiment, the lower mold board 21 includes two positioning pins 211, four through apertures 212a, a protrusion 213, and four lower fastening apertures 214. The thin board 22 is arranged above the lower mold board 21 and enclosed by the protrusion 213, and is provided with two first through holes 221, four optical fiber positioning apertures 222, and four upper fastening apertures 223. The two first through holes 221 correspond to the two positioning pins 211, and that the four optical fiber positioning apertures 222 correspond to the four through apertures 212a. The thin board 22 is fixedly engaged with the lower mold board 21, such that the four fastening elements 23 pass through the four lower fastening apertures 214, respectively, and are fastened into the four lower fastening apertures 214, and that the thin board 22 can be fixedly engaged with the lower mold board 21.

Further, in the first embodiment, the optical fiber positioning apertures 222 each has a diameter D1 smaller than a diameter D2 of each of the through apertures 212a. The thin board 22 can be formed by either one of laser cutting method, wet etching method, and dry etching method. These methods relate to quite mature technologies, and that there is no difficulty to make a preferable thin board 22 having a thickness of 0.05 mm, or a preferable optical fiber positioning aperture 222 having a diameter of 0.127 mm.

As shown in FIG. 4 and FIG. 5, an optical fiber assembly 24 includes a protective layer 241 and a bare fiber 242. The optical fiber positioning aperture 222 has a volcanic crater-like shape with an opening downward, where the optical fiber positioning aperture 222 has a cross-section roughly like a trapezoid, having a longer upper side and a shorter lower side where the opening is located at the lower side. Such structure can facilitate a positioning effect for an optical fiber line of the bare fiber 242. The thin board 22 is made of either one of plastic material, metallic material, and celluloid material; and preferably stainless material, so that after formation of the optical fiber connectors, the work of demolding becomes easier. In spite of the fact that, according to the present invention, the thin board 22 is secured by the fastening elements 23, it is understood that this is not a limitation. Also, the measure of welding or adhering can be employed to secure the thin board onto the lower mold board 21.

It should be noted that although in the first embodiment, only a structure of the positioning mold corresponding to one single optical fiber connector is proposed and described, the present invention is not limited to be so. Instead, it is obvious that the positioning mold can correspond to a plurality of optical fiber connectors.

Figure 6:
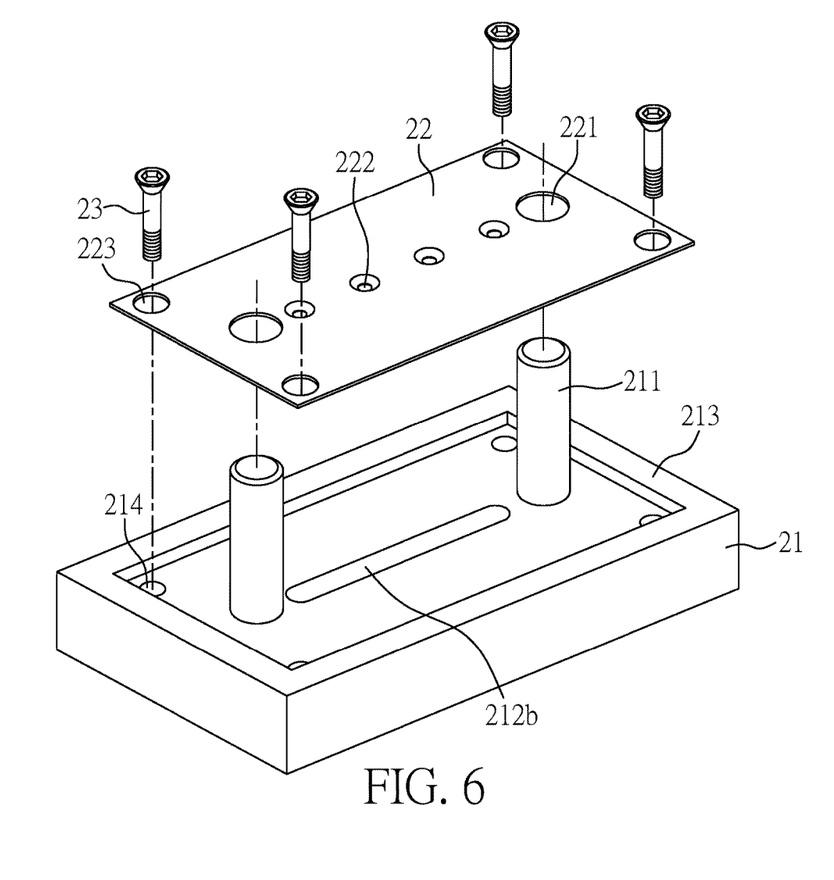
FIG. 6 is a schematic exploded view illustrating a positioning mold of optical fiber connector according to a second embodiment of the present invention.
Figure 7:
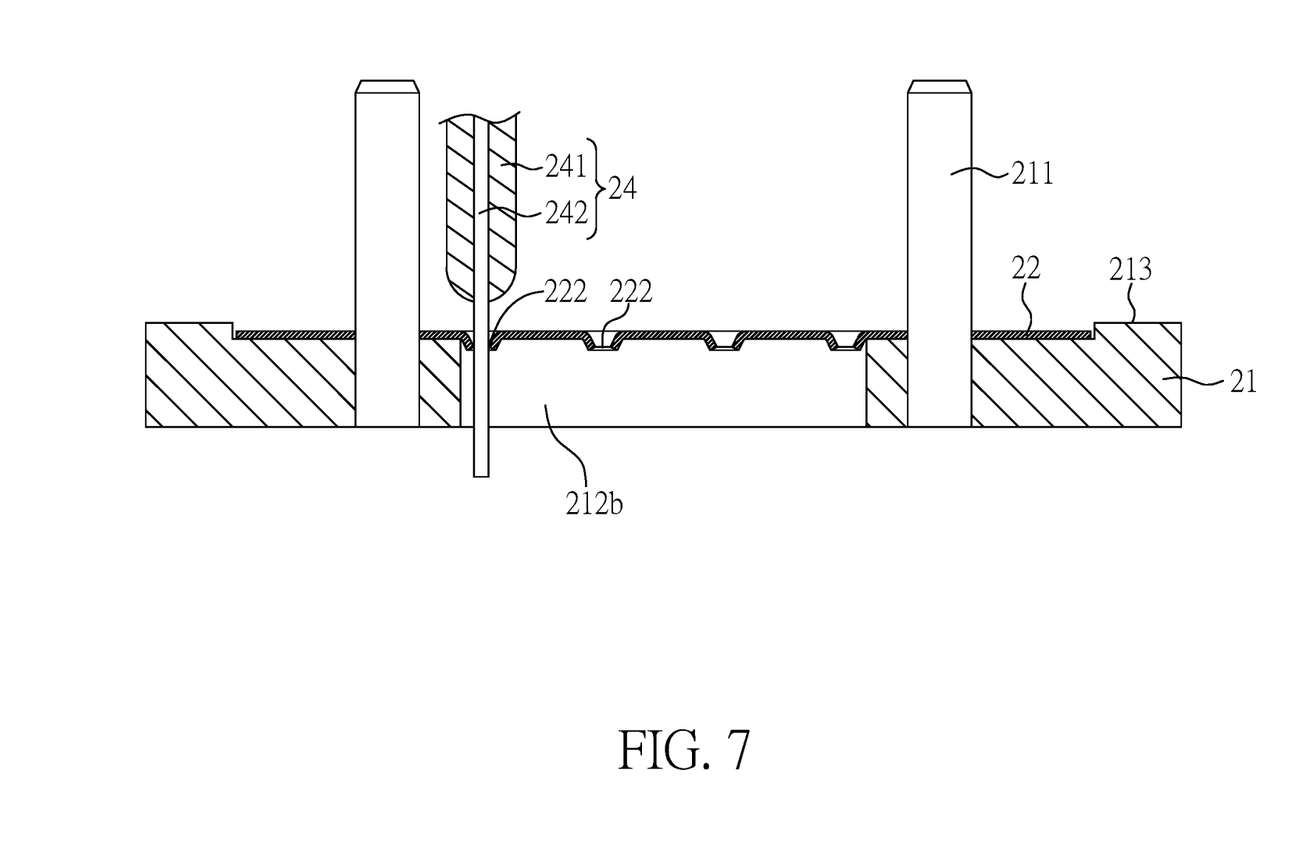
FIG. 7 is a cross-sectional view illustrating the positioning mold of optical fiber connector according to the second embodiment of the present invention.

Now references are made to FIG. 6, a schematic exploded view illustrating a positioning mold of optical fiber connector according to a second embodiment of the present invention; and FIG. 7, a cross-sectional view illustrating the positioning mold of optical fiber connector. The positioning mold of optical fiber connector, according to the second embodiment, has a structure similar to that of the first embodiment, except that in the second embodiment, a through aperture 212b having a stripe-like shape is provided, such that the through aperture 212b can correspond to the four optical fiber positioning apertures 222 of the thin board 22. This owns a merit that in case the four optical fiber positioning apertures 222 have a smaller spacing therebetween, the lower mold board 21 can be machined without much difficulty for the stripe-like through aperture 212b.

Figure 8:
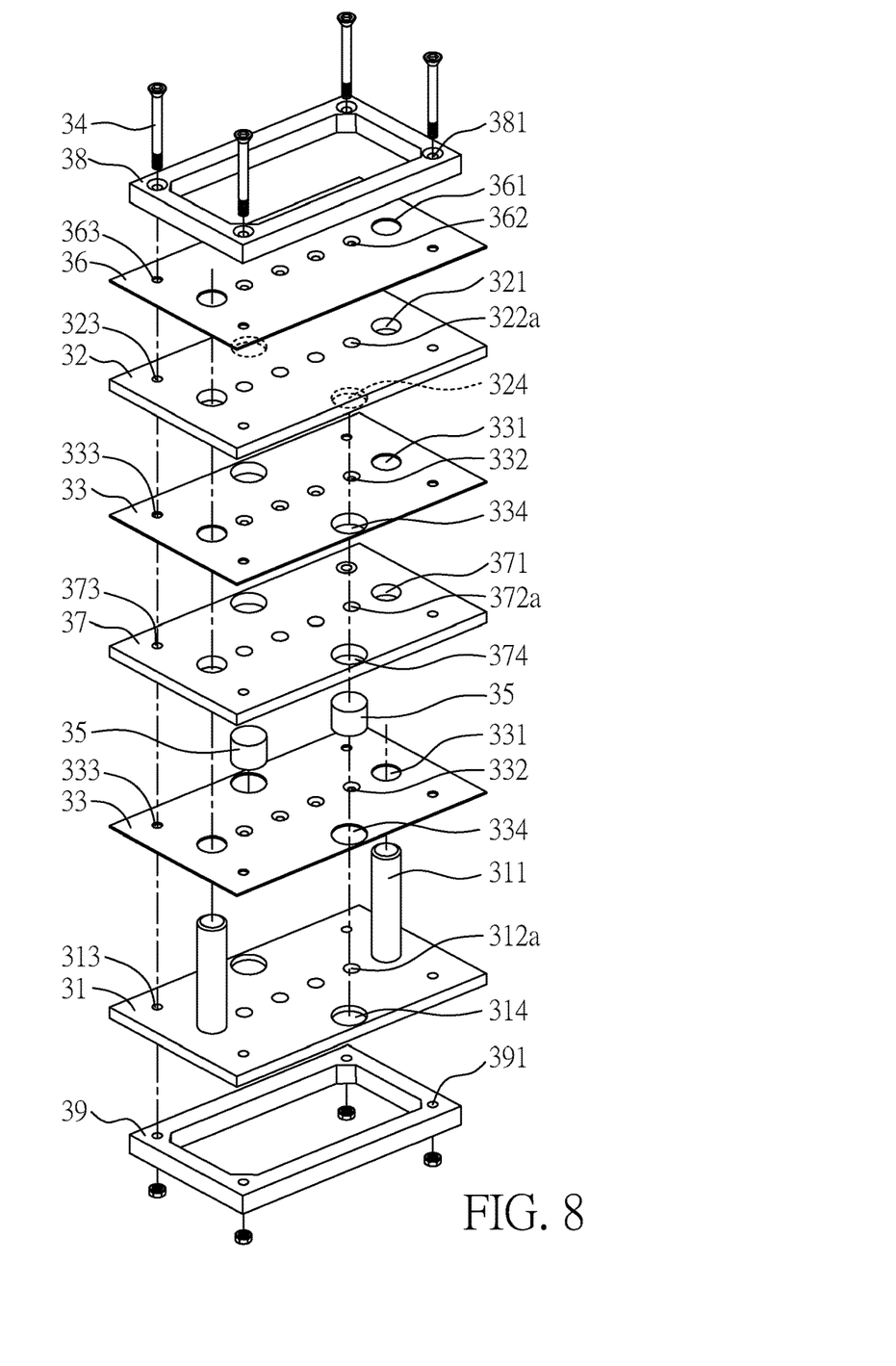
FIG. 8 is a schematic exploded view illustrating a positioning mold of optical fiber connector according to a third embodiment of the present invention.
Figure 9:
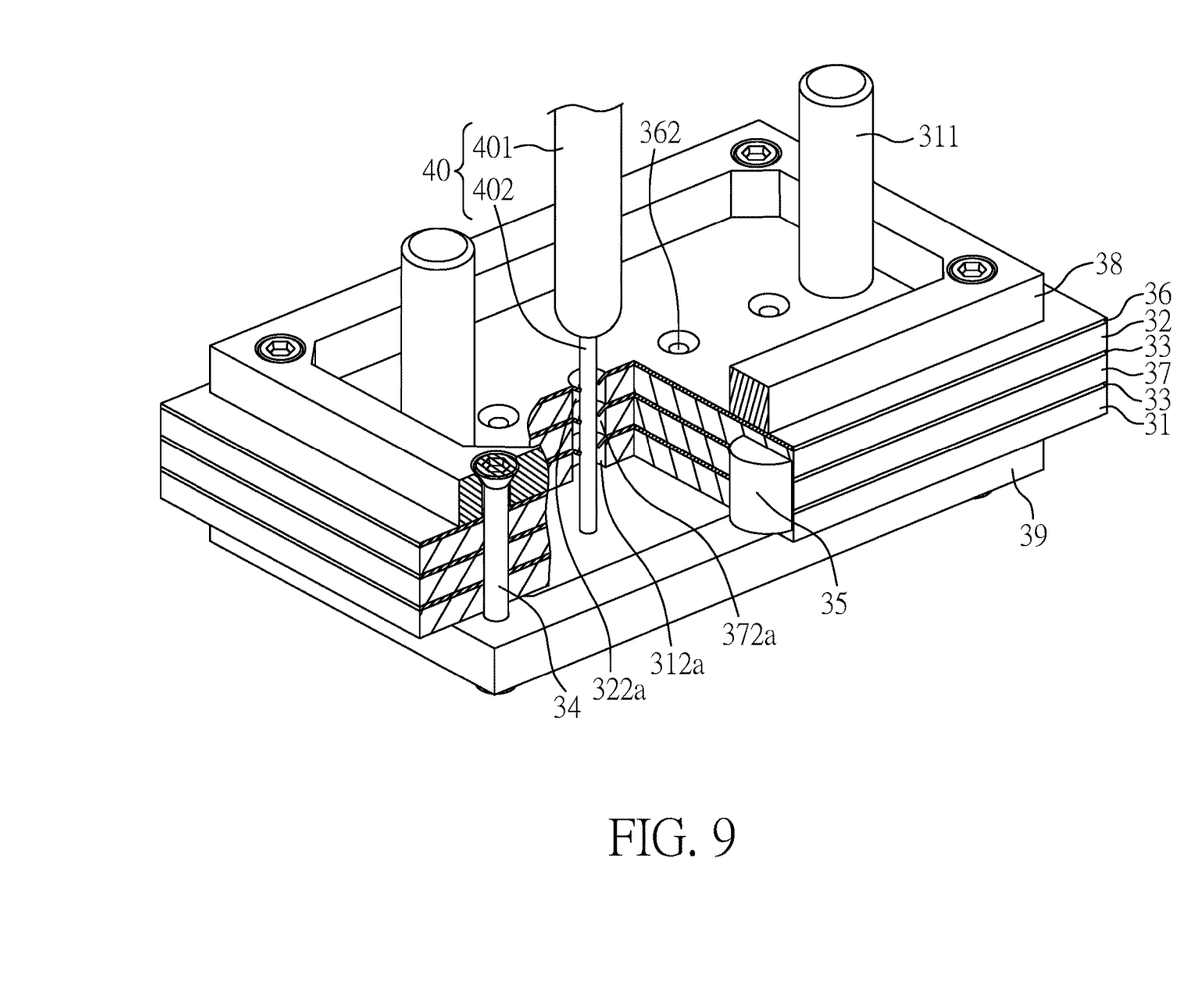
FIG. 9 is a partial cross-sectional view illustrating the positioning mold of optical fiber connector according to the third embodiment of the present invention.

Further, references are made to FIG. 8, a schematic exploded view illustrating a positioning mold of optical fiber connector according to a third embodiment of the present invention; and FIG. 9, a partial cross-sectional view illustrating the positioning mold of optical fiber connector. The positioning mold of optical fiber connector, according to the third embodiment, comprises a bottom spacing board 31, a top spacing board 32, two middle thin boards 33, four fastening elements 34, two positioning pillars 35, a top thin board 36, a middle spacing board 37, a top protrusion 38, and a bottom protrusion 39.

The bottom spacing board 31 includes two positioning pins 311, four bottom board through apertures 312a, four first fastening holes 313, and two bottom board slots 314. The top spacing board 32, arranged far above the bottom spacing board 31 (as shown), includes two first through holes 321 and four top board through apertures 322a, four second fastening holes 323 and two top board slots 324, wherein the two first through holes 321 correspond to the two positioning pins 311. The middle thin boards 33 are arranged in between the bottom spacing board 31 and the top spacing board 32, each including two second through holes 331, four first optical fiber positioning apertures 332, four third fastening holes 333 and two first positioning apertures 334, two first through holes 331. The two second through holes 331 correspond to the two positioning pins 311, the four first optical fiber positioning apertures 332 correspond to the four top board through apertures 322a and four bottom board through apertures 312a. The four fastening elements 34 correspond to the four first fastening holes 313, the four second fastening holes 323, and the four third fastening holes 333, such that the bottom spacing board 31, the top spacing board 32, and the two middle thin boards 33 can be secured together. As such, a basic structure of the positioning mold of optical fiber connector, according to the third embodiment, is accomplished, such that the four first optical fiber positioning apertures 332 can provide a positioning function for the optical fiber lines.

Further, the top thin board 36 includes two third through holes 361, four second optical fiber positioning apertures 362, and four fourth fastening holes 363. The two third through holes 361 correspond to the two positioning pins 311, the four second optical fiber positioning holes 362 correspond to the four first optical fiber positioning apertures 332, and that the four fourth fastening holes 363 correspond to the four fastening elements 34. The middle spacing board 37 includes two fourth through holes 371, four middle board through apertures 372a, four fifth fastening holes 373, and four second positioning apertures 374. The two fourth through holes 371 correspond to the two positioning pins 311, the four middle board through apertures 372a correspond to the four first optical fiber positioning apertures 332, the four fifth fastening holes 373 correspond to the four fastening elements 34, and that the four second positioning apertures 374 correspond to the two positioning pillars 35. The top protrusion 38 is arranged above the top spacing board 32, and is provided with four sixth fastening holes 381 corresponding to the four fastening elements 34. The bottom protrusion 39 is arranged below the bottom spacing board 31, and is provided with four seventh fastening holes 391 corresponding to the four fastening elements 34.

Still further, the two positioning pillars 35 can be positioned well by inserting thereof into the two bottom board slots 314 and into the two top board slots 324; and as well into the first positioning apertures 334 of the middle thin boards 33 and into the second positioning apertures 374 of the middle spacing board 37, such that the middle thin boards 33 and the middle spacing board 37 can be well positioned.

As shown in FIG. 9, an optical fiber assembly 40 includes a protective layer 401 and a bare fiber 402. The four first optical fiber positioning apertures 332 and the four second optical fiber positioning apertures 362, respectively, has a diameter smaller than that of each of the four top board through apertures 322a and smaller than that of the four bottom board through apertures 312a. As such, the bare fiber 402 can have an enhanced positioning effect for its optical fiber line. Preferably, the middle thin boards 33 each has a thickness of 0.05 mm; and so for the thickness of the top thin board 36. Both the middle thin boards 33 and the top thin board 36 are made of either one of plastic material, metallic material, and celluloid material; and preferably stainless material, so that after formation of the optical fiber connectors, the work of demolding becomes easier. In this third embodiment, preferably, the bottom spacing board 31, the top spacing board 32, and the middle spacing board 37 are all made of stainless material so as to provide a sufficient strength for the structure of the positioning mold.

It should be noted that although in the third embodiment, only a structure of the positioning mold corresponding to one single optical fiber connector is proposed and described, the present invention is not limited to be so. Instead, it is obvious that the positioning mold can correspond to a plurality of optical fiber connectors.

The first embodiment and the third embodiment of the present invention are different in that, in the first embodiment, the positioning mold of optical fiber connector adopts the lower mold board 21, which is well known, but adds the thin board 22 to achieve the purpose of positioning the optical fiber lines. In the third embodiment, the bottom spacing board 31, the top spacing board 32, the middle thin boards 33, and the top protrusion 38 are provided for constituting a structure, similar to that of the lower mold board 21 in the first embodiment, so as to achieve the purpose of positioning the optical fiber lines. In cooperation with the top thin board 36, the effect in positioning the optical fiber lines can be enhanced, let alone the work of demolding can be performed easily. Besides, in the third embodiment, the number of the middle spacing board 37 can be varied as required, so as to adjust the strength of the overall structure. Also, the number of the middle thin boards 33, and of the top thin board 36, can be varied so as to enhance the effect in positioning the optical fiber lines.

Figure 10:
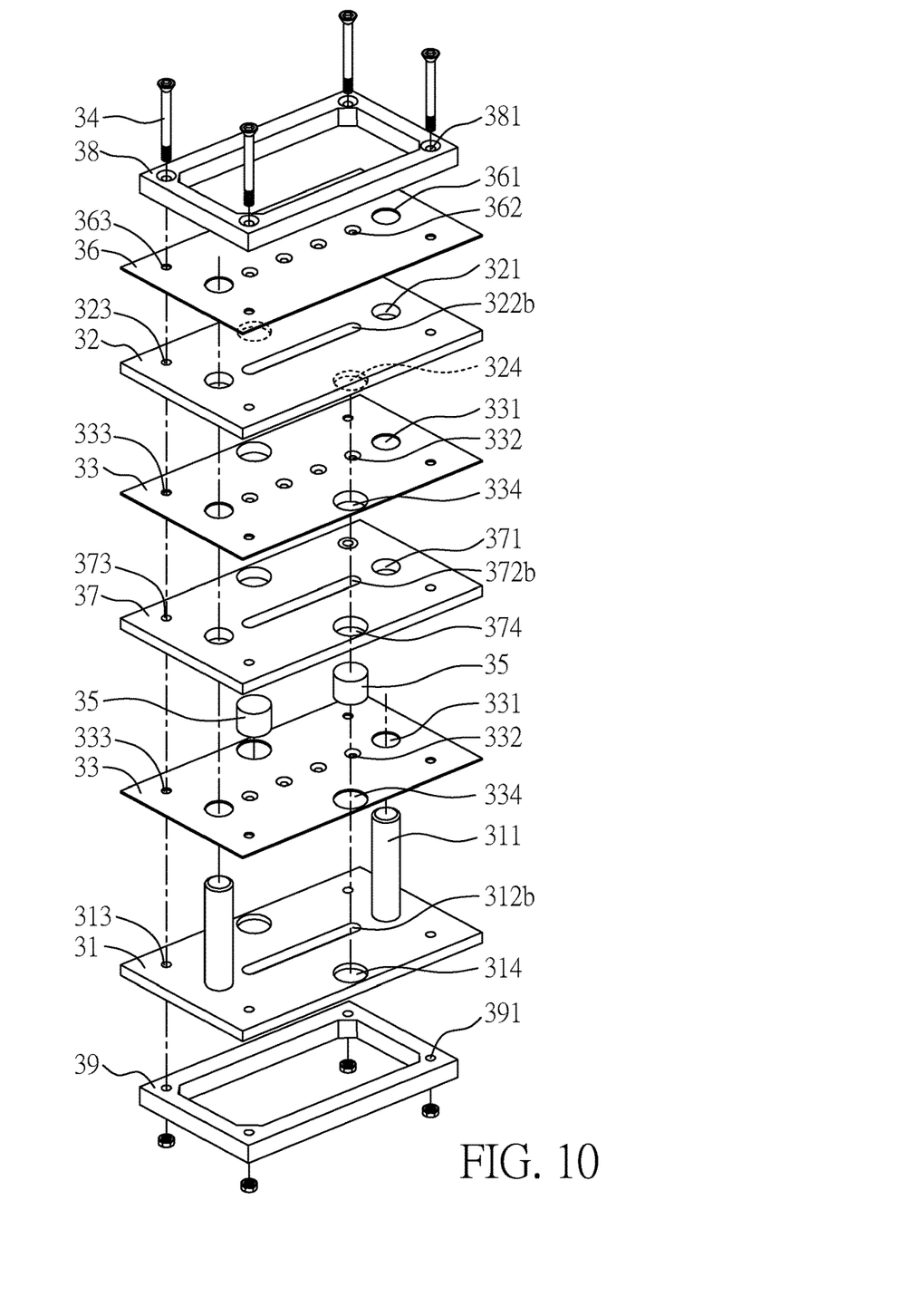
FIG. 10 is a schematic exploded view illustrating a positioning mold of optical fiber connector according to a fourth embodiment of the present invention.

Now referring to FIG. 10, a schematic exploded view illustrating a positioning mold of optical fiber connector according to a fourth embodiment of the present invention, in the fourth embodiment, the positioning mold has a structure similar to that of the third embodiment, except that in the fourth embodiment, the bottom spacing board 31 is provided with a bottom board through aperture 312b, the top spacing board 32 with a top board through aperture 322b, and the middle spacing board 37 with a middle board through aperture 372b, which have a stripe-like shape, and which can correspond to the four first optical fiber positioning apertures 332 of the middle thin boards 33, and to the four second optical fiber positioning apertures 362 of the top thin board 36. This owns a merit that in case both the four first optical fiber positioning apertures 332 and the four second optical fiber positioning apertures 362 have a smaller spacing therebetween, the corresponding stripe-like bottom board through aperture 312b, top board through aperture 322b, and middle board through aperture 372b can be machined without much difficulty.

Given the above, it is understood that the positioning mold of optical fiber connector, according to the present invention, makes use of a structural design having such as the thin board 22, the middle thin boards 33, as well as the top thin board 36 for enhancing the positioning effect of optical fiber lines, let alone the work of demolding can become easier. Besides, in case the optical fiber lines fracture inside of the optical fiber positioning apertures 222, the first optical fiber positioning apertures 332, and the second optical fiber positioning apertures 362, the fractured optical fiber lines can be taken out by removing the thin board 22, the middle thin boards 33, and the top thin board 36. This will increase the reliability and productivity in the automated production of optical fiber connectors, and improve the utilizability of the positioning molds.

Although the present invention has been explained in relation to its preferred embodiments, it is to be understood that many other possible modifications and variations can be made without departing from the scope of the invention as hereinafter claimed.

What is claimed is:

1. A positioning mold of optical fiber connector, comprising:
   a lower mold board, including two positioning pins, at least one through aperture, and a protrusion; and
   a thin board, arranged above the lower mold board, and provided with two first through holes and at least one optical fiber positioning aperture, wherein the two first through holes correspond to the two positioning pins, and the at least one optical fiber positioning aperture to the at least one through aperture, and the thin board is fixedly engaged with the lower mold board, and the protrusion is enclosing the thin board.

2. The positioning mold of optical fiber connector as claimed in claim 1, further comprising a plurality of fastening elements, wherein the lower mold board further includes a plurality of lower fastening apertures corresponding to the plurality of fastening elements, and the thin board further includes a plurality of upper fastening apertures corresponding to the plurality of fastening elements, and by the way of passing the plurality of fastening elements through the plurality of upper fastening apertures, respectively, and fastening the same into the plurality of lower fastening apertures, such that the thin board can be fixedly engaged with the lower mold board.

3. The positioning mold of optical fiber connector as claimed in claim 1, wherein the at least one optical fiber positioning aperture has a diameter smaller than a diameter of the at least one through aperture.

4. The positioning mold of optical fiber connector as claimed in claim 1, wherein the thin board is made of either one of plastic material, metallic material, and celluloid material.

5. The positioning mold of optical fiber connector as claimed in claim 1, wherein the thin board is formed by either one of laser cutting method, wet etching method, and dry etching method.

6. A positioning mold of optical fiber connector, comprising:
   a bottom spacing board, including two positioning pins, at least one bottom board through aperture, and a plurality of first fastening hole;
   a top spacing board, arranged above the bottom spacing board, and including two first through holes, at least one top board through aperture and a plurality of second fastening holes, wherein the two first through holes correspond to the two positioning pins;
   at least one middle thin board, arranged in between the bottom spacing board and the top spacing board, and including two second through holes, at least one first optical fiber positioning aperture, and a plurality of third fastening holes, wherein the two second through holes correspond to the two positioning pins, the at least one first optical fiber positioning aperture to the at least one top board through aperture and the at least one bottom board through aperture; and a plurality of fastening elements, corresponding to the plurality of first fastening holes, the plurality of second fastening holes, and the plurality of third fastening holes, such that the bottom spacing board, the top spacing board, and the at least one middle thin board can be secured together.

7. The positioning mold of optical fiber connector as claimed in claim 6, further comprising a plurality of positioning pillars, wherein the bottom spacing board further includes a plurality of bottom board slots corresponding to the plurality of positioning pillars, and the top spacing board further includes a plurality of top board slots corresponding to the plurality of positioning pillars, and the at least one middle thin board further includes a plurality of first positioning apertures corresponding to the plurality of positioning pillars.

8. The positioning mold of optical fiber connector as claimed in claim 7, further comprising a top thin board arranged above the top spacing board, wherein the top thin board includes two third through holes, at least one second optical fiber positioning apertures, and a plurality of fourth fastening holes; and wherein the two third through holes correspond to the two positioning pins, the at least one second optical fiber positioning hole to the at least one first optical fiber positioning aperture, and the plurality of fourth fastening holes to the plurality of fastening elements.

9. The positioning mold of optical fiber connector as claimed in claim 8, further comprising at least one middle spacing board, wherein the at least one middle spacing board includes two fourth through holes, at least one middle board through aperture, a plurality of fifth fastening holes, and a plurality of second positioning apertures; and wherein the two fourth through holes correspond to the two positioning pins, the at least one middle board through aperture to the at least one first optical fiber positioning aperture, the plurality of fifth fastening holes to the plurality of fastening elements, and the plurality of second positioning apertures to the plurality of positioning pillars.

10. The positioning mold of optical fiber connector as claimed in claim 9, further comprising a top protrusion arranged above the top spacing board and a bottom protrusion below the bottom spacing board, wherein the top protrusion is provided with a plurality of sixth fastening holes corresponding to the plurality of fastening elements, and the bottom protrusion is provided with a plurality of seventh fastening holes corresponding to the plurality of fastening elements.

11. The positioning mold of optical fiber connector as claimed in claim 8, wherein the at least one first optical fiber positioning aperture and the at least one second optical fiber position aperture, respectively, has a diameter smaller than that of the at least one top board through aperture and smaller than that of the at least one bottom through aperture.

12. The positioning mold of optical fiber connector as claimed in claim 11, wherein the at least one middle thin board and the top thin board are made of either one of plastic material, metallic material, and celluloid material.

\* \* \* \* \*